United States Patent [19]

Kato

[11] Patent Number: 4,766,567
[45] Date of Patent: Aug. 23, 1988

[54] ONE-CHIP DATA PROCESSING DEVICE INCLUDING LOW VOLTAGE DETECTOR

[75] Inventor: Mitsuharu Kato, Aichi, Japan

[73] Assignee: Ltd. Nippondenso Co., Kariya, Japan

[21] Appl. No.: 722,075

[22] Filed: Apr. 11, 1985

[30] Foreign Application Priority Data

Apr. 19, 1984 [JP] Japan ................................. 59-77495
Jun. 20, 1984 [JP] Japan ................................. 59-128021
Dec. 10, 1984 [JP] Japan ................................. 59-261562

[51] Int. Cl.$^4$ ........................................... G06F 11/30
[52] U.S. Cl. ..................................... 364/900; 371/66
[58] Field of Search ... 364/200 MS File, 900 MS File; 307/409, 480, 517, 522; 365/228; 371/12, 66

[56] References Cited

U.S. PATENT DOCUMENTS 108,422  6/1984  Atsushi .................. 307/480
4,479,191  10/1964  Nojima et al. .......... 364/900
4,551,841  11/1985  Fujita et al. ............ 364/900

Primary Examiner—Eddie P. Chan
Attorney, Agent, or Firm—Cushman, Darby & Cushman

[57] ABSTRACT

A one-chip semiconductor device comprises a semiconductor substrate with power supply terminals and data terminals. Formed on the substrate are a clock generating circuit for generating a clock signal when a power supply voltage is applied to it through the power supply terminals, a data processing circuit which is driven by the clock signal to process the data supplied to it through the data terminals, a first voltage detecting circuit for producing a stop signal when it detects that the power supply voltage falls below a first reference voltage, and a second voltage detecting circuit for producing a reset signal when it detects that the power supply voltage falls below a second reference voltage. The stop signal stops the clock generating circuit, whereby the data processing circuit stops and remains in the same condition as is driven by the clock signal. The reset signal initializes the data processing circuit. The first reference voltage is the lowest value which enables the data processing circuit to operate stably. The second reference voltage is the lowest value which enables the data processing circuit to remain in the same condition as is driven by the clock signal.

17 Claims, 5 Drawing Sheets

ONE-CHIP DATA PROCESSING DEVICE INCLUDING LOW VOLTAGE DETECTOR

BACKGROUND OF THE INVENTION

This invention relates to a one-chip semiconductor device comprising a semiconductor substrate and a data processing IC, e.g., a microcomputer and a microprocessor, formed on the substrate. More particularly, it relates to a one-chip semiconductor device in which a data processing can be performed without errors even if the power supply voltage changes.

Generally, a one-chip semiconductor device which can process data comprises a semiconductor substrate and a C-MOS semiconductor IC with a clock generating circuit and a data processing circuit. The substrate has power supply terminals, data terminals and other terminals. The power supply terminals are connected to an external power source, and the data terminals are coupled to an external device which the one-chip semiconductor device controls. The clock generating circuit generates clock signals as long as the power source applies voltage thereto. The clock signals are supplied to the data processing circuit and used as sync signals. The data processing circuit comprises a program memory (ROM), a data memory (RAM), an arithmetic logic unit (ALU) and an input-output section (I/O). It receives data from the outer device through the data terminals, processes the data, and outputs the same to the external device through the data terminals.

The semiconductor device has no means to prevent the data processing circuit from malfunctioning, even if the power supply voltage changes. A control signal must be supplied to the device to interrupt or initialize the data processing circuit. The device therefore has an external control terminal for supplying such a control signal. When a change of the voltage is detected, an interruption signal or a reset signal is generated outside the device. The signal is supplied to the data processing circuit through the external control terminal. As a result, the circuit stops processing data and saves it, or is initialized to start processing the same data again. Hence, the circuit makes no errors.

Therefore, the conventional device requires a control circuit for detecting changes of the power supply voltage and supplying an interruption signal or a reset signal to the data processing circuit. Any apparatus with the device must include the control circuit as well. Moreover, the one-chip semiconductor device needs to have a control terminal to receive the control signal. This inevitably increases the number of terminals the device requires. Further, the device must be able to interrupt the data processing circuit and is inevitably complex.

SUMMARY OF THE INVENTION

It is an object of the present invention to provide a one-chip semiconductor device which has a means for monitoring the condition of an external power source, and which has no terminal for receiving signals representing the changes of the condition of the power source and is therefore small. An apparatus including the semiconductor device can thus be small.

Another object of the invention is to provide a one-chip semiconductor device which can save data even if an external power supply voltage falls to endanger a continuous data processing, whereby the data processing can be resumed when the voltage rises to a normal level.

According to the first aspect of the invention, there is provided a one-chip semiconductor device comprising: a semiconductor substrate; a plurality of power supply terminals mounted on said substrate and coupled to an external power source; a plurality of data terminals mounted on said substrate for inputting data from and outputting data to an external device; a clock generating circuit formed on said substrate for generating a clock signal when supplied with the power supply voltage from the external power source; a data processing circuit formed on said substrate and driven by the clock signal supplied from said clock generating circuit for processing the data supplied from said data terminals; a first voltage detecting circuit formed on said substrate for comparing the power supply voltage with a first reference voltage which enables said data processing circuit to operate stably; a clock stopping means formed on said substrate for producing a clock stop signal when the power supply voltage falls below the first reference voltage, thereby stopping said clock generating circuit; an interruption processing means formed on said substrate for stopping said data processing circuit and maintaining the condition thereof when said clock generating circuit is stopped; a second voltage detecting circuit formed on said substrate for comparing the power supply voltage with a second reference voltage which enables said data processing circuit to remain in the same condition; and an initializing means formed on said substrate for producing an initializing signal when the power supply voltage falls below the second reference voltage, thereby putting said data processing circuit into a start condition.

According to the second aspect of this invention, there is provided a one-chip semiconductor device comprising: a semiconductor substrate; a plurality of power supply terminals mounted on said substrate and coupled to an external power source; a plurality of data terminals mounted on said substrate for inputting data from and outputting data to an external device; a clock generating circuit formed on said substrate for generating a first clock signal and a second clock signal of a frequency lower than that of the first clock signal, when supplied with the power supply voltage from the external power source; a clock selecting means formed on said substrate for selecting one of the clock signals generated by said clock generating circuit; a data processing circuit formed on said substrate and driven by the clock signal selected by said clock selecting means for processing the data supplied from said data terminals; a first voltage detecting circuit formed on said substrate for comparing the power supply voltage with a first reference voltage which enables said data processing circuit to operate stably; a select signal generating means formed on said substrate for producing a first select signal to make said clock selecting means select the first clock signal when said first voltage detecting circuit detects that the power supply voltage rises above the first reference voltage and for producing a second select signal to make said clock selecting means select the second clock signal when said first voltage detecting circuit detects that the power supply voltage falls below the first reference voltage; a second voltage detecting circuit formed on said substrate for comparing the power supply voltage with a second reference voltage which enables said data processing circuit to operate when the second clock signal is supplied to the data processing circuit; and an initializing means formed on said substrate for producing an initializing signal when the power supply voltage falls below the second reference voltage, thereby putting said data processing circuit into a start condition.

According to the third aspect of the invention, there is provided a one-chip semiconductor device comprising: a semiconductor substrate; a plurality of power supply terminals mounted on said substrate and coupled to an external power source; a plurality of data terminals mounted on said substrate for inputting data from and outputting data to an external device; a clock generating circuit formed on said substrate for generating a first clock signal and a second clock signal of a frequency lower than that of the first clock signal, when supplied with the power supply voltage from the external power source; a clock selecting means formed on said substrate for selecting one of the clock signals generated by said clock generating circuit; a data processing circuit formed on said substrate and driven by the clock signal selected by said clock selecting means for processing the data supplied from said data terminals; a program counter formed on said substrate for causing said data processing circuit to process data; an instruction decoder formed on said substrate for outputting a non-operation instruction; a first voltage detecting circuit formed on said substrate for comparing the power supply voltage with a first reference voltage which enables said data processing circuit to operate stably; a select signal generating means formed on said substrate for producing a first select signal to make said clock selecting means select the first clock signal when said first voltage detecting circuit detects that the power supply voltage rises above the first reference voltage and for producing a second select signal to make said clock selecting means select the second clock signal when said first voltage detecting circuit detects that the power supply voltage falls below the first reference voltage; an actuating means formed on said substrate for stopping said program counter and causing said instruction decoder to output a non-operation instruction when said first voltage detecting means detects that the power supply voltage falls below the first reference voltage; a second voltage detecting circuit formed on said substrate for comparing the power supply voltage with a second reference voltage which enables said data processing circuit to remain in the same condition as is driven by the second clock signal; and an initializing means formed on said substrate for producing an initializing signal when the power supply voltage falls below the second reference voltage, thereby putting said data processing circuit into a start condition.

DETAILED DESCRIPTION OF THE PREFERRED EMBODIMENTS

A few embodiments of the invention will now be described with reference to the accompanying drawings.

Figure 1:
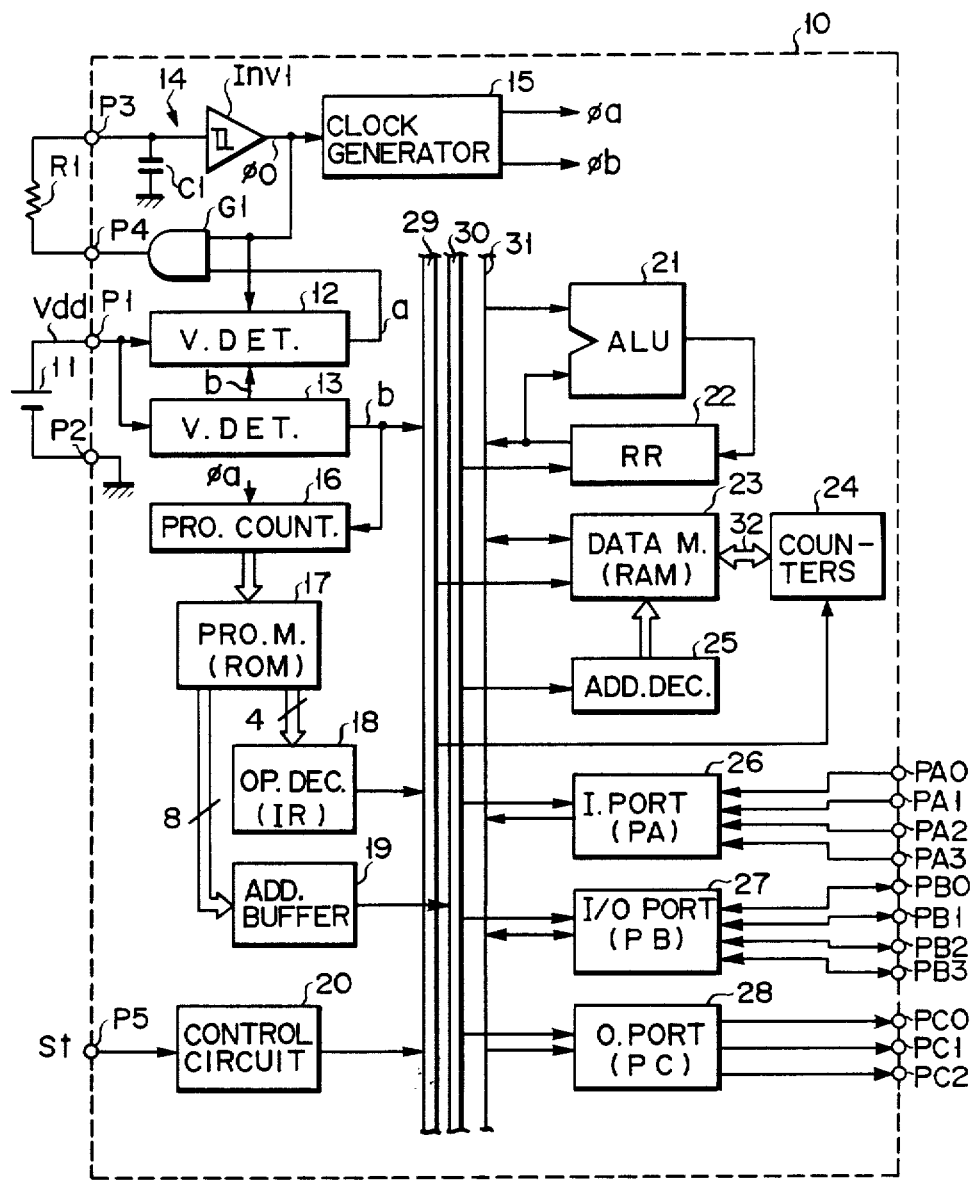
FIG. 1 is a block diagram of a one-chip semiconductor device according to the present invention.

FIG. 1 shows a one-chip semiconductor device, i.e., the first embodiment of the invention. The device has a semiconductor substrate 10. Power supply terminals P1 and P2, data input terminals PA0–PA3, and data input-output terminals PB0–BP3 and data output terminals PC0–PC2 are mounted on substrate 10. An external power source 11 applies voltage Vdd to terminals P1 and P2. Data terminals PA0–PA3, PB0–PB3 and PC0–PC2 are coupled to an external device which is controlled by the one-ship semiconductor device. Also mounted on substrate 10 are clock control terminals P3 and P4 and a terminal P5. Terminals P3 and P4 are coupled to an external resistor R1. A test signal is supplied to terminal P5.

A C-MOS IC is formed on substrate 10, with a first voltage detecting circuit 12, a second voltage detecting circuit 13, a data processing circuit and a clock generating circuit. The data processing circuit processes the data input from the external device through terminals PA0–PA3 and PB0–PB3 and supplies the processed data to the external device through terminals PB0–PB3 and PC0–PC2. The clock generating circuit generates clock signals and supplies them to the data processing circuit.

The clock generating circuit comprises a first clock generator 14 and a second clock generator 15. First clock generator 14 generates a reference clock signal $\phi 0$. Second clock 15 generator receives the reference clock signal $\phi 0$ from clock generator 14 and generates two clock signals $\phi a$ and $\phi b$. Clock generator 14 is comprised of a capacitor C1, a hysteresis inverter Inv1 and an AND gate G1. Capacitor C1, inverter Inv1 AND gate G1 and the above-mentioned external resistor R1 constitute a loop. When power supply voltge Vdd is applied to first clock generator 14 via power supply terminals P1 and P2, clock generator 14 generates a clock signal $\phi 0$ having a frequency which is determined by the resistance of R1 and the capacitance of C1. Hysteresis inverter Inv1 determines the start voltage and stop voltage of clock generator 14, the former being higher than the latter. When a signal of logical level "1" is supplied to AND gate G1, first clock generator 14 stops generating reference clock signal $\phi 0$.

As stated above, second clock generator 15 produces two clock signals $\phi a$ and $\phi b$ from the reference clock signal $\phi 0$ output by first clock generator 14. Signals $\phi a$ and $\phi b$ are produced in synchronism with the signal from first clock generator 14 do not overlap. They are supplied to the components of the data processing circuit.

The data processing circuit comprises a program counter 16, a program memory (ROM) 17, an instruction decoder (IR) 18, an address buffer 19, a test mode control circuit 20, an arithmetic logic unit (ALU) 21, a result register (RR) 22, a data memory (RAM) 23, an address decoder 24, counters 25, an input port (PA) 26, an input-output port (PB) 27, and an output port (PC) 28. The data processing circuit has a control bus 29 for supplying control signals to its components, and an address bus 30 for supplying address signals to some of its components, and a data bus 31 for transmitting data to and from its components. This is a static circuit as a whole.

First voltage detecting circuit 12 detects whether or not power supply voltage Vdd has fallen below the lowest value Vs (hereinafter called "first lower limit") that can stably operate the data processing circuit. Circuit 12 produces a stop signal a which has a logical level "0" when Vdd≦Vs. Signal a is supplied to AND gate G1 of first clock generator 14.

Second voltage detecting circuit 13 detects whether or not voltage Vdd has fallen below the lowest value Vr (hereinafter called "second lower limit") that can maintain the condition of the data processing circuit. Circuit 13 generates a reset signal b which has a logical level of "1" when Vdd≦Vr. Reset signal b is supplied to some of the component of the data processing circuit through control bus 29.

Program counter 16 of the data processing circuit counts clock signals $\phi a$ generated by second clock generator 15. It outputs a signal representing its count. This signal is supplied to program memory 17 as an address signal to select an instruction. Program memory 17 designates a specific instruction in accordance with the signal. Memory 17 is a 12-bit one. The upper four bits form an instruction, which is supplied to control bus 29 through instruction decoder 18. The lower eight bits form an operand address, which is supplied to address bus 30 through address buffer 19.

Arithmetic logic unit 21 and result register 22 form a so-called accumulator. Data memory 23 is coupled by a bus 32 to counters 24. Memory 23 stores the counts of these counters in accordance with the address data obtained by address decoder 25.

Figure 2:
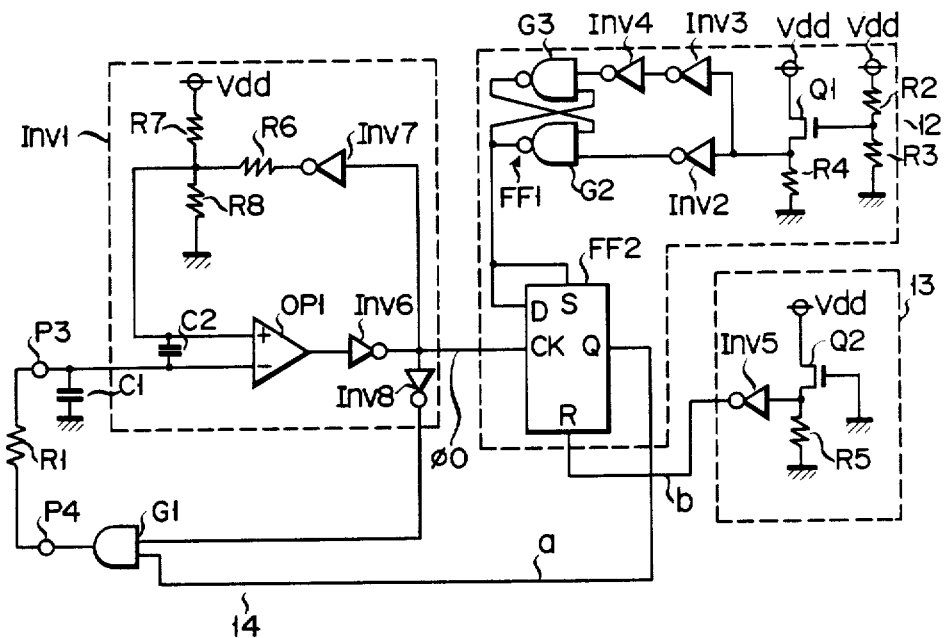
FIG. 2 is a circuit diagram of the first and second voltage detecting circuits and first clock generating circuit included in the device of FIG. 1.

FIG. 2 shows voltage detecting circuits 12 and 13 and hysteresis inverted Inv1 in greater detail. First voltage detecting circuit 12 includes a P-MOS gate Q1 and diffusion resistors R2-R4. The threshold voltage VTP(H) of gate Q1 is about 2.0 V higher than those of the gates used in the other components. Circuit 12 further comprises an inverter Inv2 having a relatively high logic threshold voltage, an inverter Inv3 having a relatively low threshold voltage and an inverter Inv4 whose threshold voltage is lower than that of inverter Inv2 and higher than that of inverter Inv3. It further includes an RS flip-flop FF1 made of two NAND gates G2 and G3, and a D set-reset flip-flop FF2.

First lower limit Vs is determined by the threshold voltage VTP(H) of P-MOS gate Q1 and by the ratio of R2 to R3. RS flip-flop FF1 has a hysteresis characteristic and sets NAND gate G2 and resets NAND gate G3. Its hysteresis width is determined by the characteristics of inverters Inv2 and Inv3 which have different logical threshold voltages. First voltage detecting circuit 12 is driven by D flip-flop FF2 in synchronism with clock signal $\phi 0$ supplied from first clock generator 14. The pulse width of signal $\phi 0$ is not too short.

Second voltage detecting circuit 13 comprises a P-MOS gate Q2, a bias resistor R5 and an inverter Inv5. The threshold voltage of gate Q2 is similar to that of P-MOS gate Q1 used in the first voltage detecting circuit 12. The second lower limit Vr is equal to threshold voltage VTP(H).

Hysteresis inverter Inv1 comprises a capacitor C2, a differential voltage comparator Op1, inverters Inv-6–Inv8, and resistors R6–R8. Its hysteresis width is determined by the ratio of R6:R7:R8.

The operation of the one-chip semiconductor device shown in FIGS. 1 and 2 will be described.

Any C-MOS IC fails to operate correctly when the power supply voltage Vdd falls below a specific lower limit Vmin. Therefore, in the semiconductor device of FIGS. 1 and 2, first lower limit Vs is greater than Vmin, and the second lower limit Vr is less than Vmin. That is, Vs>Vmin>Vr. Hence, when power supply voltage Vdd falls below first lower limit Vs, first clock generator 14 stops generating clock signal $\phi 0$, thereby maintaining the condition of the data processing circuit. When power supply voltage Vdd falls below second lower limit Vr, the data processing circuit is initialized to return to its starting condition. Therefore, the data processing circuit will make no errors even if power supply voltage Vdd changes.

More specifically, as voltage Vdd gradually rises from 0 V to second lower limit Vr, second voltage detecting circuit 13 continuously outputs reset signal b. Signal b is supplied through program counter 16 and control bus 29 to other components of the data processing circuit. Program counter 16 and these circuit components are therefore initialized. First voltage detecting circuit 12 detects that Vdd is lower than Vs. Stop signal a, i.e., the output signal of circuit 12, is therefore at logical level "1." Signal a therefore maintains the output of AND gate G1 at logical level "0." Hence, first clock generator 14 remains to produce clock signal $\phi 0$.

As power supply voltage Vdd rises from Vr to Vs, second voltage detecting circuit 13 does not generate reset signal b. Also in this condition, stop signal a, i.e., the output signal of circuit 12, is at logical level "1." First clock generator 14 therefore still remains to produce clock signal $\phi 0$. Hence, the data processing circuit can start its function. When power supply voltage Vdd rises above first lower limit Vs, circuit 12 detects this fact and sets its output signal a at logical level "0." As a result, first clock generator 14 starts generating clock signal $\phi 0$, and the data processing circuit can start operating.

When power supply voltage Vdd falls to Vs, circuit 12 detects this fact and sets its output signal a at logical level "1." First clock generator 14 stops generating clock signal $\phi 0$. As a result, the data processing circuit remains in the same condition as it was when voltage Vdd reached Vs. (The components of the data processing circuit are static elements so that the circuit may readily remain in a certain condition.) When power supply voltage Vdd further falls to Vr, second voltage detecting circuit 13 detects this and outputs a reset signal b. Consequently, the data processing circuit is initialized and put into its starting condition.

In first voltage detecting circuit 12, D flip-flop FF2, which outputs stop signal a, is driven by clock signal $\phi 0$, as shown in FIG. 2. This is because circuit 12 does not cause the first clock generator 14 to unconditionally produce clock signal $\phi 0$ whenever voltage Vdd rises above Vs. Rather, circuit 12 makes generator 14 generate no clock signal $\phi 0$ when the data processing circuit finishes executing an instruction and enters the next clock cycle. Therefore, clock signal $\phi 0$ always provides the minimum clock period that the data processing circuit must execute any instruction possible.

Hysteresis inverter Inv1 imparts first clock generator 14 such a hysteresis characteristic that the start and stop voltages have a difference of about 20 mV. Owing to this specific hysteresis characteristic of clock generator 14, the data processing circuit will make no errors even if the power supply voltage Vdd has dropped to about Vs. Generally, the lower limit for power supply voltage Vdd is Vmin, as mentioned above. In the one-chip semiconductor device, this lower limit can be far lower than Vmin since generator 14 is automatically stopped in the manner described above, thus maintaining the data processing circuit in the present condition. More specifically, the data processing circuit can operate even when power supply voltage Vdd falls to the second lower limit Vr.

Now, the embodiment of FIGS. 1 and 2 will be described with reference to exemplary numerical data and also to the timing chart of FIG. 3.

Suppose that the circuit elements formed on substrate 10 form a MOS IC, that each P-MOS element and each N-MOS element have threshold voltages VTP and VTN, both being 1 V, and that P-MOS gates Q1 and Q2 have the same threshold voltage VTP(H) of 1.0 V and the ratio of R2 to R3 is 4:3.

Let us assume that first lower limit voltage Vs is about 3.5 V, and second lower limit voltage Vr is about 2.0 V. It is also assumed that the lowest voltage VT which can maintain the data processing circuit in the present condition is about 1.0 V since this voltage VT is nearly equal to the maximum value of threshold voltages VTP and VTN. In the case where a clock signal is forcedly supplied to terminal P3 from the external device, the lowest voltage Vmin that can ensure a stable operation of the data processing circuit is 3.0 V, and the highest voltage is 6.0 V.

Figure 3:
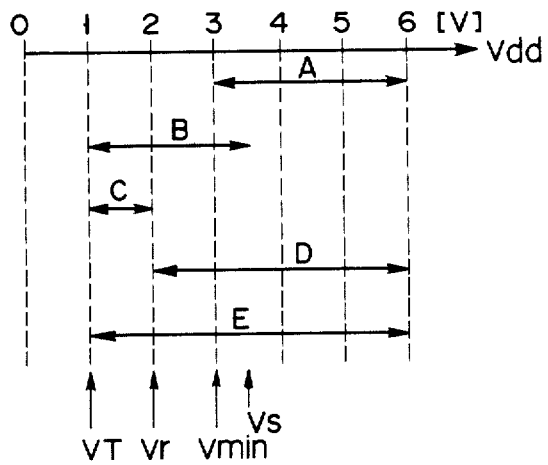
FIG. 3 illustrates the ranges of the power supply voltage in which the data processing circuit included in the device of FIG. 1 can operate.

FIG. 3 illustrates various ranges of power supply voltage Vdd in which the data processing circuit can stably operate and various signals are generated. Line A shows the range in which the data processing circuit stably operates. Line B indicates the range in which stop signal a remains at logical level "1." Line C indicates the range in which reset signal b is generated. Line D shows the range in which the data processing circuit can perform its function. Line E indicates the range in which the condition of the circuit can be maintained when stop signal a is at logical level "1" or a reset signal is generated.

As is understood from FIG. 3, the one-chip semiconductor device perfectly operates as long as power supply voltage Vdd ranges from 3.0 to 6.0 V, and its conditions remain unchanged when voltage Vdd changes within the range from 2.0 to 3.5 V since stop signal a is automatically generated over this range. Hence, the this device can operate over the greater range of Vdd, from 2.0 to 6.0 V. When Vdd falls to 2.0 V, the data processing circuit is initialized. Therefore, the device can operate over an even longer range of Vdd, from 1.0 to 6.0 V.

The data processing circuit can stably operate even if voltage Vdd abruptly rises at the start of power supply or varies thereafter. This is because Vmin is lower than Vs, that is, the range of Vdd in which the data processing circuit can operate overlaps the range of Vdd in which stop signal a stays at logical level "1." The data processing circuit never fails to maintain its condition as long as voltage Vdd is within the range from 1.0 to 6.0 V.

The data processing circuit makes no errors even when the power supply voltage varies. Hence, the one-chip semiconductor device requires no external control circuit for preventing the data processing circuit from malfunctioning. Nor does it need terminals to receive control signals from such a control circuit, or an interruption circuit, i.e., a relatively complex electronic component. Further, since the lower limit of Vdd that enables the data processing circuit to operate is very low, the device functions well particularly when its external power source is unstable due to turbulence of electric waves, or due to high-frequency, high-voltage noise (e.g., the ignition noise generated by an electronic device attached to an automobile.)

Figure 4:
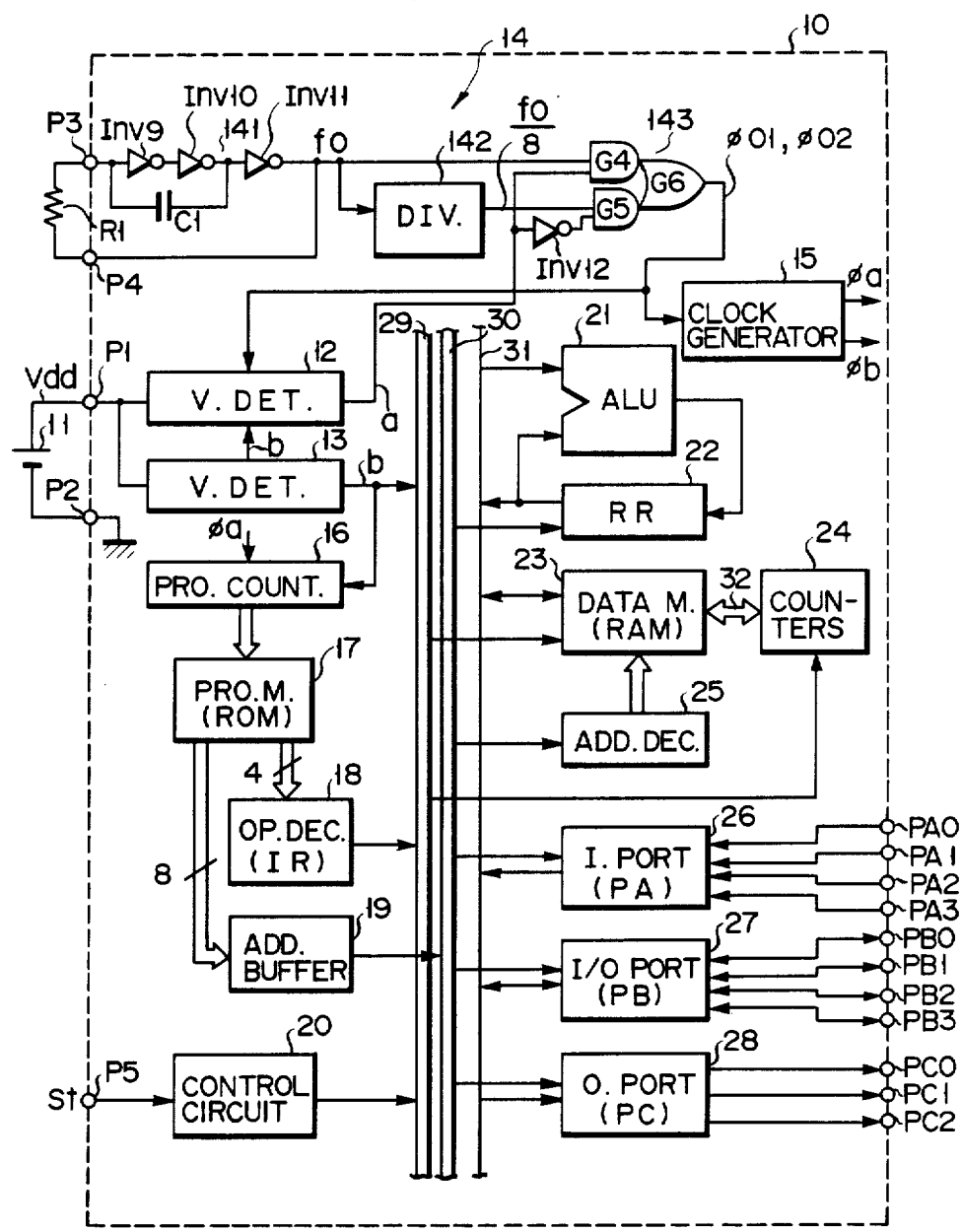
FIG. 4 is a block diagram of another one-chip semiconductor device according to the present invention.

Now, the second embodiment of the invention, i.e., another one-chip semiconductor device, will be described with reference to FIGS. 4 to 6. In FIG. 4, the same symbols and numerals as used in FIG. 1 are used to denote similar or the same components as those of the first embodiment. The similar or the same components will not be described.

The one-chip semiconductor device shown in FIG. 4 includes a data processing circuit comprised of dynamic circuit elements. A first clock generating circuit 14 comprises a first clock generating section 141, a second clock generating section 142 and a clock selecting section 143. First clock generating section 141 is comprised of an external resistor R1, a capacitor C1 and inverters Inv9–Inv10. It generates a first clock signal $\phi 01$ of a first frequency f0 determined by the logical threshold voltage of inverter Inv9, the resistance of resistor R1 and the capacitance of capacitor C1. Second clock generating section 142 is a frequency divider Div which divides frequency f0 by 8 and generates a second clock signal $\phi 02$ whose frequency is $\frac{1}{8}$ f0. Clock selecting section 143 comprises an inverter Inv12, AND gates G4 and G5 and an OR gate G6. Section 143 selects first clock signal $\phi 01$ or second clock signal $\phi 02$ in accordance with the output a of a first voltage detecting circuit 12. The selected clock signal is supplied to a second clock generating circuit 15.

First voltage detecting circuit 12 detects whether or not power source voltage Vdd has fallen below the lowest value Vs (hereinafter called "first lower limit") that can operate the data processing circuit stably. Circuit 12 produces a clock selecting signal a which has logical level "0" when Vdd≦Vs. This clock selecting signal is supplied to AND gate G4 and also to AND gate G5 through inverter Inv10. In accordance with the logical level of signal a, clock selecting section 143 selects first clock signal $\phi 01$ or second clock signal $\phi 02$.

Second voltage detecting circuit 13 detects whether or not voltage Vdd has fallen below the lowest value Vr (hereinafter called "second lower limit") that can maintain the condition of the data processing circuit. Circuit 13 generates a reset signal b which has a logical level "1" when Vdd≦Vr. Reset signal b is supplied to some of the components of the data processing circuit through a control bus 29.

Figure 5:
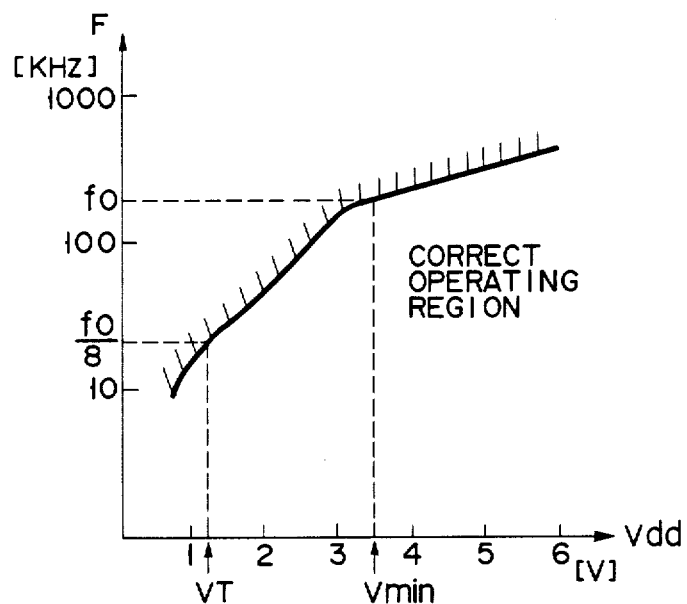
FIG. 5 shows the relationship between the operation frequency of the data processing circuit included in the device of FIG. 4 and the power supply voltage of this data processing circuit.

Generally, the operation frequency and power supply voltage of a MOS IC have the relationship shown in FIG. 5. The MOS IC fails to operate correctly if power supply voltage Vdd falls below the lower limit Vmin which can operate the IC when its operation frequency is f0. In the one-chip semiconductor device shown in Fig. 4, the data processing circuit can no longer correctly operate if voltage Vdd is below value Vmin. Therefore, Vs is higher than Vmin, and Vr is lower than Vmin. That is, Vs>Vmin>Vr. Hence, when voltage Vdd falls below first lower limit Vs, first clock signal φ01 having frequency f0 is replaced by second clock signal φ02 having a frequency ⅛ f0. When voltage Vdd falls below the second lower limit Vr, the data processing circuit is initialized to return to its starting condition. In this way, the data processing circuit is prevented from making errors even if voltage Vdd rises and falls.

More specifically, as voltage Vdd gradually rises from 0 V to Vr, second voltage detecting circuit 13 continuously outputs reset signal b. Signal b is supplied to a program counter 16 and some of the other circuits of the data processing circuit through control bus 29. Program counter 16 and these circuit components are therefore initialized. First voltage detecting circuit 12 detects that Vdd is lower than Vs. Clock selecting signal a, i.e., the output signal of circuit 12, is therefore at logical level "1." Signal a therefore maintains the output of AND gate G1 at logical level "0." Hence, clock selecting section 143 selects second clock signal φ02, which is supplied to second clock generating circuit 15.

As power supply voltage Vdd rises from second lower limit Vr to first lower limit Vs, reset signal b (i.e., the output signal of second voltage detecting circuit 12) is at logical level "0." In this condition, clock selecting signal a (i.e., the output signal of circuit 12) is also at logical level "1." Clock selecting section 143 still selects second clock signal φ02 having frequency ⅛ f0 which ensures the operation of the data processing circuit despite the fact voltage Vdd is below Vs. Hence, the data processing circuit can operate. When voltage Vdd rises above Vs, first voltage detecting circuit 12 detects this fact and sets clock selecting signal a at logical level "1." As a result, clock selecting section 143 selects first clock signal φ01 having frequency f0, which is supplied to second clock generating circuit 15. Hence, the data processing circuit can start operating.

When power supply voltage Vdd falls to Vs, circuit 12 detects this fact and sets clock selecting signal a at logical level "0." Clock selecting section 143 thus selects second clock signal φ02 having frequency ⅛ f0. As a result, the data processing circuit remains in the same condition as it was when voltge Vdd reached Vs. That is, except for a timer, whose operation depends on the frequency of a clock signal, all other components remain in the same condition though the clock frequency has been changed from f0 to ⅛ f0. When voltage Vdd rises above Vs thereafter, the data processing circuit starts operating again from the condition it has maintained. Hence, in the device of FIG. 4, the data processing circuit can operate in spite of a drop of power supply voltage Vdd which lasts for a short time. When power supply voltage Vdd further falls to Vr, second voltage detecting circuit 13 detects this and outputs a reset signal b. Consequently, the data processing circuit is initialized and put into its starting condition.

Like circuit 12 shown in FIG. 2, first voltage detecting circuit 12 includes a D flip-flop. This flip-flop is driven by first clock signal φ01 or second clock signal φ02 supplied from clock generating circuit 14. Therefore, circuit 12 does not cause the first clock generator 14 to unconditionally produce clock second signal φ02 whenever voltage Vdd falls to or below Vs. Rather, circuit 12 changes the logical level of signal a from "1" to "0" when the data processing circuit finishes executing an instruction and enters the next clock cycle. As a result, generator 14 generates clock signal φ02. Therefore, clock signals φ01 and φ02 always provide the minimum clock cycle which the data processing circuit must have in order to execute any instruction.

Generally, the lower limit for power supply voltage Vdd is Vmin as mentioned above. Nonetheless, in the one-chip semiconductor device of FIG. 4, this lower limit can be far lower than Vmin since the frequency of the clock signal is lowered whenever power supply voltage Vdd falls, thereby maintaining the data processing circuit in the present condition. More specifically, the data processing circuit can operate even when power supply voltage Vdd falls to second lower limit Vr.

Now, the embodiment of FIG. 4 will be described with reference to exemplary numerical data and also to the timing chart of FIG. 6.

Suppose first lower limit voltage Vs is about 4.0 V, and second lower limit voltage Vr is about 2.0 V. It is also assumed that the lowest voltage VT, which can maintain the data processing circuit in the present condition when second clock signal φ02, has a voltage of about 1.5 V. Further, let us assume that the lower limit and upper limit of Vdd for a stable operation of the data processing circuit when a test signal St has been applied from an external device to terminal P5 to make first voltage detecting circuit 12 inoperative are 3.5 V and 6.0 V, respectively. In this case, the data processing circuit operates in various ranges of Vdd as illustrated in FIG. 6.

Figure 6:
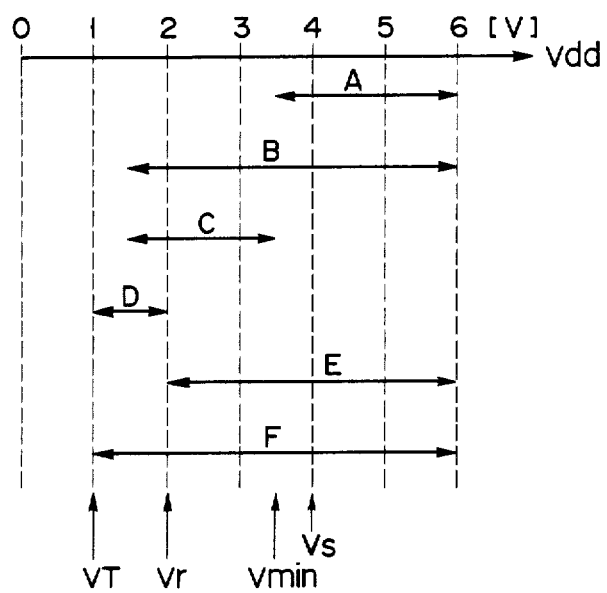
FIG. 6 illustrates the ranges of power supply voltage in which the data processing circuit included in the device of FIG. 4 can operate and various signals are generated.

In FIG. 6, line A denotes the range in which the data processing circuit stably operates when the clock frequency is f0, and line B indicates the range in which the circuit stable works when clock frequency is ⅛ f0. Line C represents the range in which the circuit cannot stably operate when the clock frequency is f0, but can stably operate when the frequency is ⅛ f0. Line D shows the range in which the circuit is reset, line E denotes the range in which the circuit can operate, and line F indicates the range in which the circuit can actually operate.

As is understood from FIG. 6, the semiconductor device of FIG. 4 perfectly operates when power supply voltage Vdd ranges from 3.5 to 6.0 V and when the clock signal is f0, and its conditions remain unchanged when voltage Vdd changes within the range from 2.0 to 4.0 V since the clock frequency is automatically lowered to ⅛ f0 over this range. Hence, the device can operate over the greater range of Vdd, from 2.0 to 6.0 V. When Vdd falls to 2.0 V, the data processing circuit is initialized. Therefore, the device can operate over an even longer range of Vdd, from 1.0 to 6.0 V.

The data processing circuit can stably operate even if voltage Vdd abruptly rises at the start of the power supply or varies thereafter. This is because Vmin is lower than Vs, that is, the range of Vdd in which the data processing circuit can operate when the clock frequency is f0 overlaps the range of Vdd in which the circuit operates when the clock frequency is ⅛ f0, and the range of Vdd in which the circuit operates when the clock frequency is ⅛ f0 overlaps the range of Vdd in which the circuit is reset. The data processing circuit never fails to maintain its condition as long as voltage Vdd is within the range from 1.0 to 6.0 V.

The one-chip semiconductor device shown in FIG. 4 has the same advantages as the first embodiment (FIGS. 1 and 2). Since first clock signal φ01, from which second clock signal φ02 is produced, need not have a very accurate frequency, first clock generating section 141 may be replaced by a ring oscillator of the known type or a CR clock oscillator similar which is completely built on semiconductor substrate 10. When a ring oscillator is used, its output frequency lowers in proportion to the speed of the data processing circuit which is lowered due to the drop of power supply voltage. Therefore, the above-mentioned advantages will be more prominent.

Figure 7:
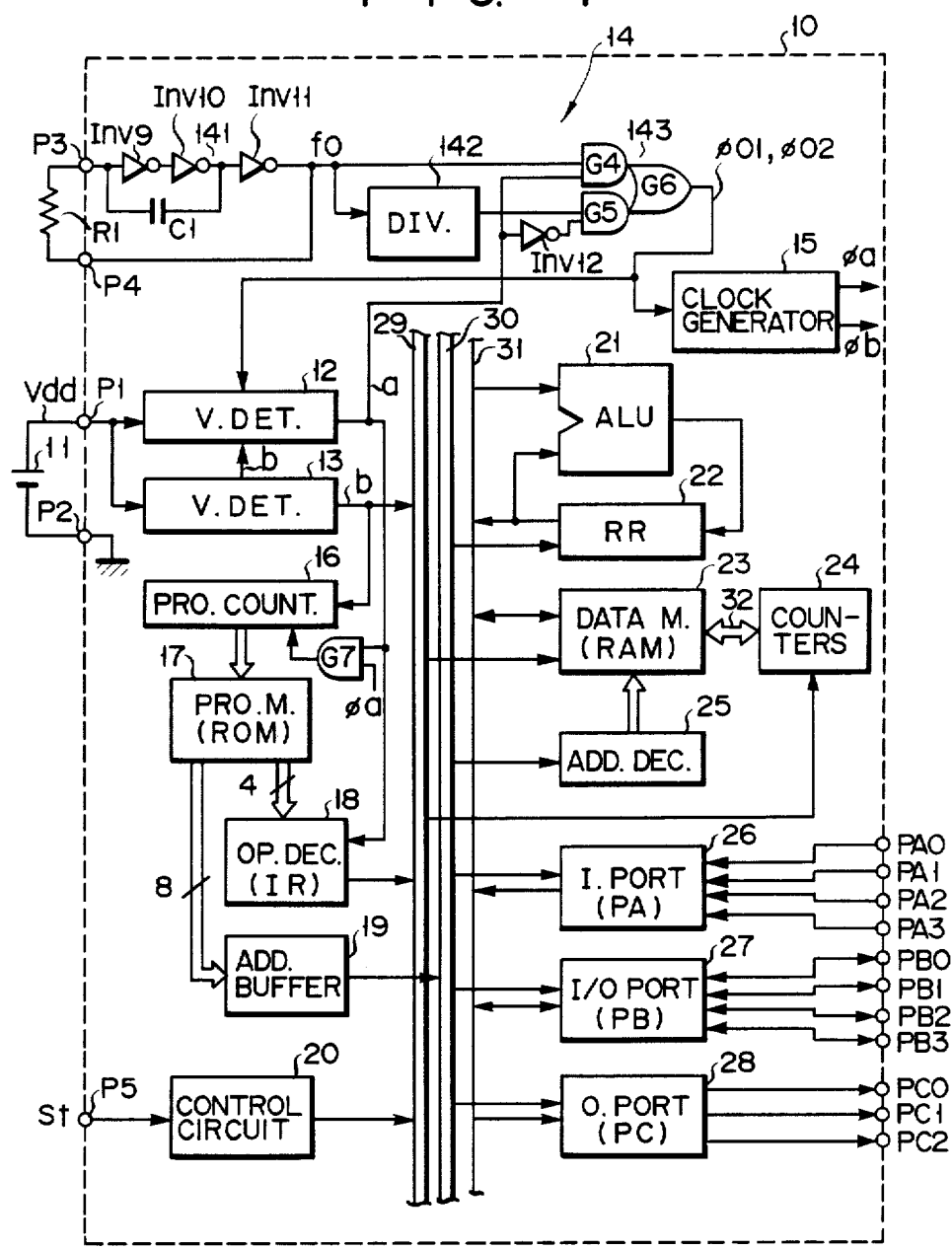
FIG. 7 is a block diagram of a further one-chip semiconductor device according to the present invention.

Now, with reference to FIG. 7, the third embodiment of the invention will be described. In FIG. 7, the same symbols and numerals as used in FIG. 4 are used to denote similar or the same components as those of the second embodiment. The similar or the same components will not be described.

The embodiment, which is an improvement of the second embodiment, is a one-chip semiconductor device in which a data processing circuit can be stopped when necessary. A clock signal $\phi a$ is supplied to a program counter 16 through an AND gate G7. The output signal a of a first voltage detecting circuit 12 controls AND gate G7 and an instruction decoder 18. When decoder 18 detects that power supply voltage Vdd becomes equal to or lower than Vs and the output signal a of circuit 12 falls to logical level "0," it generates a no-operation (NOP) instruction.

When power supply voltage Vdd≦Vr or higher than Vr or when Vr<Vdd≦Vs, the device of FIG. 7 operates in the same way as the device of FIG. 4, except that AND gate G7 produces no clock signal $\phi a$ since clock selecting signal a from first voltage detecting circuit 12 remains at logical level "0." Hence, when voltage Vdd≦Vr or higher than Vr or when Vr<Vdd≦Vs, program counter 16 remains to operate. Also in this condition, instruction decoder 18, which receives signal a, outputs NOP instruction. Therefore, the data processing circuit is in waiting condition.

When voltage Vdd rises above Vs, first voltage detecting circuit 12 detects this. As a result, clock selecting signal a rises to logical level "1," and a clock selecting section 143 selects first clock signal $\phi 01$ having frequency f0. When it receives clock signal $\phi a$, program counter 16 starts operating. At the same time, instruction decoder 18 outputs the instruction corresponding to the data stored in a program memory 17. Hence, the data processing circuit comes into operation.

When power supply voltage Vdd falls to Vs or below Vs, first voltge detecting circuit 12 detects this, whereby its output signal, i.e., clock selecting signal a, falls to logical level "0." Clock selecting section 143 therefore selects second clock signal $\phi 02$ having frequency ½ f0. Program counter 16 stops operating, and instruction decoder 18 outputs NON instruction. Hence, the data processing circuit continues to operate stably despite the fall of voltage Vdd. The device of FIG. 7 operates in the same way as the device of FIG. 4 when voltage Vdd rises above Vs or when it becomes equal to or lower than Vr.

In the third embodiment (FIG. 7), when power supply voltage Vdd falls, clock selecting signal a is generated to select a clock signal of lower frequency so that the data processing circuit may continuously operate. All the components of this device are not dynamic circuits. Rather, some of them are half-dynamic circuits. A clock signal is not generated whenever necessary, so that the data processing circuit may maintain its condition. More specifically, any component of the circuit is put in static state at a specific phase of the clock signal and then first clock generating section 141 is stopped. The device of FIG. 7 is more complex than the second embodiment. It achieves the same advantages as the first embodiment.

What is claimed is:

1. A one-chip semiconductor device comprising:
   a semiconductor substrate;
   a plurality of power supply terminals mounted on said substrate and adapted to be coupled to an external power source;
   a plurality of data terminals mounted on said substrate for receiving data from and outputting data to an external device;
   clock generating means formed on said substrate for generating a clock signal when supplied with a power supply voltage from the external power source;
   data processing means formed on said substrate and driven by the clock signal supplied from said clock generating means, for processing the data supplied from said data terminals;
   first voltage detecting means formed on said substrate for comparing the power supply voltage with a first reference voltage, said first reference voltage of a level above which said data processing means operates stably;
   clock stopping means formed on said substrate, for producing a clock stop signal when the power supply voltage falls below the first reference voltage, thereby stopping said clock generating means;
   interruption processing means, formed on said substrate and connected to receive said clock stop signal, for interrupting said data processing means and maintaining the condition thereof when said clock generating means is stopped;
   second voltage detecting means, formed on said substrate, for comparing the power supply voltage with a second reference voltage, said second reference voltage of a level above which said data processing means can retain its contents; and
   initializing means formed on said substrate, for producing an initializing signal to the data processing means when the power supply voltage falls below the second reference voltage, thereby initializing said data processing means to restart the operation from a beginning of its operation.

2. A one-chip semiconductor device according to claim 1, wherein the first reference voltage is slightly higher than the lowest voltage which enables said data processing means to operate stably, and the second reference voltage is slightly higher than the lowest voltage which enables said data processing means to remain in the same condition.

3. A one-chip semiconductor device according to claim 1, wherein said data processing means is a static circuit and remains in the same condition when stopped by said interruption processing means.

4. A one-chip semiconductor device according to claim 1, wherein said clock stopping means includes means, controlled by the clock signal, to provide a clock cycle of a minimum length required by said data processing means to execute an instruction.

5. A one-chip semiconductor device according to claim 1, wherein said clock generating means can generate a clock signal when the power supply voltage is higher than the first reference voltage.

6. A one-chip data processing device comprising:
   a semiconductor substrate;

a plurality of power supply terminals mounted on said substrate and adapted to be coupled to an external power source;

a plurality of data terminals mounted on said substrate for receiving data from and outputting data to an external device;

clock generating means, formed on said substrate, for generating a first clock signal, and a second clock signal of a frequency lower than that of the first clock signal, when supplied with the power supply voltage from the external power source;

clock selecting means, formed on said substrate and connected to said clock generating means, for selecting one of the clock signals generated by said clock generating means based on a signal applied thereto;

data processing means, formed on said substrate and driven by the clock signal selected by said clock selecting means, for processing said data from said data terminals;

first voltage detecting means formed on said substrate for comparing the power supply voltage with a first reference voltage, said first reference voltage being a level above which said data processing circuit can operate stably;

selecting signal generating means, formed on said substrate and responsive to said first voltage detecting means, for producing a signal to command said clock selecting means to select the first clock signal when said power supply voltage is above the first reference voltage, and for producing a signal to command said clock selecting means to select the second clock signal when said power supply voltage is below the first reference voltage;

a second voltage detecting means, formed on said substrate, for comparing the power supply voltage with a second reference voltage, said second reference voltage being a level above which said data processing circuit can operate when the second clock signal is supplied to the data processing; and initializing means formed on said substrate for producing an initializing signal to the data processing means when the power supply voltage falls below the second reference voltage, thereby initializing said data processing means to restart the operation from a beginning of its operation.

7. A one-chip semiconductor device according to claim 6, wherein the first reference voltage is slightly higher than the lowest voltage which enables said data processing means to operate stably, and the second reference voltage is slightly higher than the lowest voltage which enables said data processing means to operate when the second clock signal is supplied to the data processing means.

8. A one-chip semiconductor device according to claim 6, wherein said clock selecting means operates in synchronism with the selected clock signal to select the other clock signal.

9. A one-chip data processing device comprising:
a semiconductor substrate;
a plurality of power supply terminals mounted on said substrate and adapted to be coupled to an external power source;
a plurality of data terminals mounted on said substrate for receiving data from and outputting data to an external device;
clock generating means, formed on said substrate, for generating a first clock signal, and a second clock signal of a frequency lower than that of the first clock signal, when supplied with the power supply voltage from the external power source;

clock selecting means, formed on said substrate and connected to said clock generating means, for selecting one of the clock signals generated by said clock generating means based on a signal applied thereto;

data processing means, formed on said substrate and driven by the clock signal selected by said clock selecting means, for processing said data from said data terminals;

program counter means formed on said substrate for maintaining a program count to said data processing means to process data;

instruction decoder means formed on said substrate for outputting a non-operation instruction;

first voltage detecting means, formed on said substrate, for comparing the power supply voltage with a first reference voltage, said first reference voltage being a level above which said data processing means can operate stably;

select signal generating means, formed on said substrate and responsive to said first voltage detecting means, for producing a signal to command said clock selecting means to select the first clock signal when said power supply voltage rises above the first reference voltage, and for producing a signal to command said clock selecting means to select the second clock signal when said power supply voltage falls below the first reference voltage;

actuating means, formed on said substrate, for stopping said program counter means and causing said instruction decoder means to output a non-operation instruction when said first voltage detecting means detects that the power supply voltage falls below the first reference voltage;

second voltage detecting means, formed on said substrate, for comparing the power supply voltage with a second reference voltage, said second reference voltage being a level above which said data processing means can retain its contents when driven by the second clock signal; and initializing means formed on said substrate for producing an initializing signal to the data processing means when the power supply voltage falls below the second reference voltage, thereby initializing said data processing means into a start condition to restart the operation from a beginning of its operation.

10. A one-chip semiconductor device according to claim 9, wherein the first reference voltage is slightly higher than the lowest voltage which enables said data processing means to operate stably, and the second reference voltage is slightly higher than the lowest voltage which enables said data processing means to remain in the same condition when the second clock signal is supplied to the data processing means.

11. A one-chip semiconductor device according to claim 9, wherein said actuating means is synchronized with one of the first clock signal or the second clock signal.

12. A one-chip data processing device comprising:
a semiconductor substrate;
a plurality of power supply terminals mounted on said substrate and adapted to be coupled to an external power source;

a plurality of data terminals mounted on said substrate, for receiving data input from, and outputting data to, an external device;

clock generating means, formed on said substrate, for generating a clock signal which has a frequency determined by a control signal;

data processing means, formed on said substrate and connected to said clock generating means and said data terminals, and driven by the clock signal generated by said clock generating means, for processing said data input from said data terminals;

voltage detecting means, formed on said substrate and connected to the power supply terminals, for detecting a power supply voltage level;

clock frequency control means, formed on said substrate and connected to said clock generating means and said voltage detecting means, for producing said control signal used for controlling said clock generating means such that a frequency of the clock signal is lowered when a decrease in said power supply voltage level is detected by said voltage detecting means; and initializing means, formed on said substrate, for producing an initializing signal to said data processing means when the power supply voltage level detected by said voltage detecting means, falls below a range that ensures a normal state of said data processing means, to restart the operation of said data processing means from a beginning of its operation.

13. A one-chip data processing device according to claim 12, wherein said data processing means is a dynamic circuit including a dynamic RAM.

14. A one-chip data processing device according to claim 6, wherein said data processing circuit is a dynamic circuit including a dynamic RAM.

15. A one-chip data processing device according to claim 6, wherein said clock generating circuit includes frequency control means for lowering the frequency of the second clock signal in accordance with a decrease in the power supply voltage.

16. A one-chip data processing device according to claim 15, wherein said frequency control means includes a ring oscillator.

17. A one-chip data processing device according to claim 9, wherein said data processing circuit is a dynamic circuit including a dynamic RAM.

* * * * *

UNITED STATES PATENT AND TRADEMARK OFFICE
CERTIFICATE OF CORRECTION

PATENT NO. : 4,766,567
DATED : August 23, 1988
INVENTOR(S) : KATO, Mitsuhara

It is certified that error appears in the above-identified patent and that said Letters Patent is hereby corrected as shown below:

On the title page

The following line currently reads:
--[73] Assignee: Ltd. Nippondenso Co., Kariya, Japan--

This line should read as follows:
--[73] Assignee: Nippondenso Co., Ltd., Kariya, Japan--.

Signed and Sealed this

Seventeenth Day of January, 1989

Attest:

DONALD J. QUIGG

*Attesting Officer*   *Commissioner of Patents and Trademarks*